(12) United States Patent
Schulz et al.

(10) Patent No.: US 10,781,833 B2
(45) Date of Patent: Sep. 22, 2020

(54) HYDRAULIC HYBRID SYSTEM FOR ROTATORY APPLICATIONS

(71) Applicant: Hydac Fluidtechnik GmbH, Suizbach/Saar (DE)

(72) Inventors: Frank Schulz, Blieskastel-Bierbach (DE); Peter Bruck, Althornbach (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 1189 days.

(21) Appl. No.: 13/261,913

(22) PCT Filed: Nov. 9, 2012

(86) PCT No.: PCT/EP2012/004655
§ 371 (c)(1),
(2) Date: May 30, 2014

(87) PCT Pub. No.: WO2013/079152
PCT Pub. Date: Jun. 6, 2013

(65) Prior Publication Data
US 2014/0325974 A1   Nov. 6, 2014

(30) Foreign Application Priority Data

Dec. 3, 2011   (DE) .................. 10 2011 120 227

(51) Int. Cl.
*F15B 1/24*        (2006.01)
*F15B 21/14*       (2006.01)
(Continued)

(52) U.S. Cl.
CPC ............. *F15B 21/14* (2013.01); *B60K 6/12* (2013.01); *F15B 1/024* (2013.01); *F15B 1/24* (2013.01);
(Continued)

(58) Field of Classification Search
CPC .. F15B 2211/216; F15B 1/24; F15B 2201/31; F15B 2211/20569
See application file for complete search history.

(56) References Cited

U.S. PATENT DOCUMENTS 3,945,207 A * 3/1976 Hyatt ................... B60K 6/12
                                                    417/225
4,760,697 A * 8/1988 Heggie ................ B60K 6/12
                                                    180/165

(Continued)

FOREIGN PATENT DOCUMENTS

DE   42 12 542 A1   4/1992
DE   601 18 987 T2  1/2007

*Primary Examiner* — F Daniel Lopez
(74) *Attorney, Agent, or Firm* — Wenderoth, Lind & Ponack, L.L.P.

(57) ABSTRACT

A hydraulic hybrid system for rotatory applications has an actuator (49, 91) in the form of a motor pump unit (91). The motor pump unit is coupled to a rotatory-operating device (94) and works as a consumer of hydraulic energy in one operating state of the device (94) and works as a producer of hydraulic energy in another operating state of the device (94). A hydraulic accumulator (1) can be charged by the motor pump unit (91) for energy storage in the one operating state and can be discharged for energy release to the motor pump unit (91) in the other operating state. The hydraulic accumulator is an adjustable hydropneumatic piston accumulator (1) in which a plurality of pressure chambers (19, 21, 23, 25) are delimited by active surfaces (11, 13, 15, 17) of different sizes on the fluid side of the accumulator piston (5). An adjusting arrangement (51) connects a selected pressure chamber (19, 21, 13, 25) or a plurality of selected pressure chambers (19, 21, 23, 25) of the piston accumulator (1) to the actuator (49, 91) depending on the prevailing pressure level on the gas side of the piston accumulator (1) and at the actuator (49, 91).

16 Claims, 3 Drawing Sheets

(51) Int. Cl.
*B60K 6/12* (2006.01)
*F15B 1/02* (2006.01)
*F15B 11/024* (2006.01)
*F15B 13/02* (2006.01)

(52) U.S. Cl.
CPC .......... *F15B 11/024* (2013.01); *F15B 13/021* (2013.01); *F15B 2201/205* (2013.01); *F15B 2201/31* (2013.01); *F15B 2201/413* (2013.01); *F15B 2201/51* (2013.01); *F15B 2211/20569* (2013.01); *F15B 2211/212* (2013.01); *F15B 2211/625* (2013.01); *F15B 2211/633* (2013.01); *F15B 2211/6309* (2013.01); *F15B 2211/88* (2013.01); *Y02E 60/15* (2013.01); *Y02T 10/6208* (2013.01)

(56) References Cited

U.S. PATENT DOCUMENTS

| | | | |
|---|---|---|---|
| 5,971,027 A | 10/1999 | Beachley | |
| 6,145,311 A | 11/2000 | Cyphelly | |
| 7,100,723 B2 * | 9/2006 | Roethler | B60K 6/12 180/165 |
| 8,959,905 B2 * | 2/2015 | Baltes | B60K 6/12 60/414 |
| 9,631,647 B2 * | 4/2017 | Schulz | F15B 21/14 |

* cited by examiner

HYDRAULIC HYBRID SYSTEM FOR ROTATORY APPLICATIONS

FIELD OF THE INVENTION

The invention relates to a hydraulic hybrid system for rotary applications. The system has an actuator in the form of a motor pump unit, which is coupled with a rotary-operating device, for example a traction drive. The motor pump unit works as a consumer of hydraulic energy in one operating state of the unit and as a producer of hydraulic energy in another operating state of the unit. The hydraulic hybrid system has a hydraulic accumulator, which can be charged by the motor pump unit for energy storage in the one operating state, and which can be discharged for energy release to the motor pump unit in the other operating state.

BACKGROUND OF THE INVENTION

Given the increasing scarcity of resources and the increased efforts to save energy associated therewith, hybrid systems of the type described above are becoming increasingly important. In such systems, a motor pump unit is disposed between a drive motor, for example in the form of an internal combustion engine or electric motor, and a rotary device, for example a traction drive. The motor pump unit is operated in the system in a semi-closed hydraulic circuit, which, in combination with a hydraulic accumulator serving as an energy store, forms a hybrid system that makes energy conservation possible. In the manner common in such hybrid systems, in the case of operating states in which the primary drive in the form of the internal combustion engine or electric motor is able to provide an excess of power as compared to the actuator, for example in the case of the braking processes of a traction drive (regenerative braking), the hydraulic accumulator for energy storage will be charged by the motor pump unit. In the case of operating states in which increased efficiency is required at the actuator, for example, for the acceleration processes of a traction drive, energy stored in the hydraulic accumulator is returned to the system in a discharging process for a power surge.

In the relevant hybrid systems of this kind from the prior art, the efficiency of the energy conversion leaves something to be desired. One reason for this is the dependency of the charging and discharging processes of the hydraulic accumulator on the respective system pressure. More specifically, the hydraulic accumulator can only be charged when the system pressure is greater than the gas pressure present in the accumulator on the gas side. If this system pressure cannot be established in the respective operating situation of the device, such as the traction drive, it will not be possible to accumulate energy in the accumulator. The discharging process of the accumulator is also subject to the limitation that energy from the accumulator can only be fed back into the system when the accumulator pressure is greater than the current system pressure. There is an additional problem in the fact that, in the case of an accumulator pressure that is greater than the current, needed system pressure, the pressure level of the accumulator and the system must be balanced by valves. Thus, the energy, which is latent in the differential pressure between the accumulator pressure and the system pressure, is lost as a result of throttling losses. Attempts to mitigate these problems by using a variable displacement pump for the motor pump unit leads, on the one hand, to operating behavior that is inadequate, and to a significant expense for the costly variable displacement pump on the other hand.

A hydraulic energy storage system is known in the prior art from DE 601 18 987 T2. The fluid outlets of a pump-motor unit are coupled to a high-pressure chamber and a low-pressure chamber of a double piston accumulator. The pistons in the individual chambers of the double piston accumulator are connected to one another by a piston rod. The known energy storage system is particularly suitable for use in vehicles, to be able to store energy at high power levels, and to be able to release energy again. In terms of advantageous energy conversion however, the known solution leaves something to be desired.

SUMMARY OF THE INVENTION

An object of the invention is to provide an improved hybrid system of the type under consideration, which allows a more advantageous energy conversion than with the known solutions.

This object is basically achieved according to the invention by a hybrid system having at least one hydraulic accumulator providing an adjustment option. The accumulator provides a plurality of pressure chambers, which are adjacent to active surfaces of different sizes on the fluid side of the accumulator piston. An adjustment assembly connects a selected pressure chamber or a plurality of selected pressure chambers of the piston accumulator to the actuator, depending on the respective prevailing pressure level on the gas side of the piston accumulator and at the actuator. This arrangement provides the possibility of recycling energy regardless of the pre-charge pressure on the gas side of the accumulator and independent of the respective system pressure that corresponds to the current operating state of the actuator system pressure, because the respective desired pressure level at the accumulator can be used for charging or discharging by selecting an active surface of the appropriate size. An optimal energy conversion is thereby possible for all operating states.

In an especially advantageous manner, a control logic unit may be associated with the adjustment assembly. The logic unit processes the signals from sensor devices for the control of the valves associated with the adjustment assembly. The sensor devices display or provide signals representative of the pressure level on the gas side of the piston accumulator and the respective operating state of the actuator. The logic unit thereby controls the energy transformation by deciding how the accumulator should be charged or discharged based on the system pressure, e.g. the operating state of the actuator, and the state of charge at the accumulator. In so doing, the user can influence the logic unit by entering the user's own presets, and thereby determine the load characteristic of the hybrid system.

With regard to the construction of the piston accumulator, the configuration may be advantageously made such that the accumulator piston is configured as a step piston for the formation of active surfaces of different sizes. That piston has partial piston surfaces that are adjacent to cylinder surfaces on its fluid side. The accumulator housing has corresponding mating surfaces that are adjacent to cylinder surfaces, which mating surfaces, together with partial piston surfaces associated therewith, each delimit separate pressure chambers.

Active surfaces on the accumulator piston and mating surfaces on the accumulator housing are preferably disposed at an axial spacing from one another. The active surfaces and mating surfaces may be provided in the form of annular surfaces or circular surfaces, which are disposed concentrically to the longitudinal axis.

In terms of controlling the pressure chambers of the piston accumulator, advantageously the adjustment assembly has selector valves. By these valves, the respective pressure chambers of the piston accumulator selected for charging or discharging can be connected to the actuator. The remaining pressure chambers can be connected to the tank. Controlled by the control logic unit, a selected pressure chamber or a combination of selected pressure chambers can be connected to the actuator for charging or discharging, while non-selected pressure chambers can be emptied without pressure to the tank during the discharging of the active pressure chamber, and refilled from the tank during the charging of the active pressure chambers. Selecting the active pressure chambers provides the opportunity to efficiently charge the accumulator precisely with the currently available system pressure. Even small amounts of pressure are sufficient. When discharging the accumulator, the surface combination is selected that converts the gas pressure into a hydraulic pressure, which is only slightly above the needed system pressure, thereby enabling an extremely efficient discharge of the accumulator.

In the case of the selector valves for the control of the pressure chambers of the accumulator, these may be digital fast-switching valves. In the case of changes in the accumulator pressure or the system pressure, the surface combination may be changed during the charging processes or discharging processes. The sensor devices, which supply the signals that are to be processed by the control logic unit, may have pressure sensors, which display or provide signals representative of the filling pressure on the gas side of the piston accumulator and the system pressure at the actuator. Also, they may have a speed sensor, which indicates the rotational speed at the motor pump unit.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
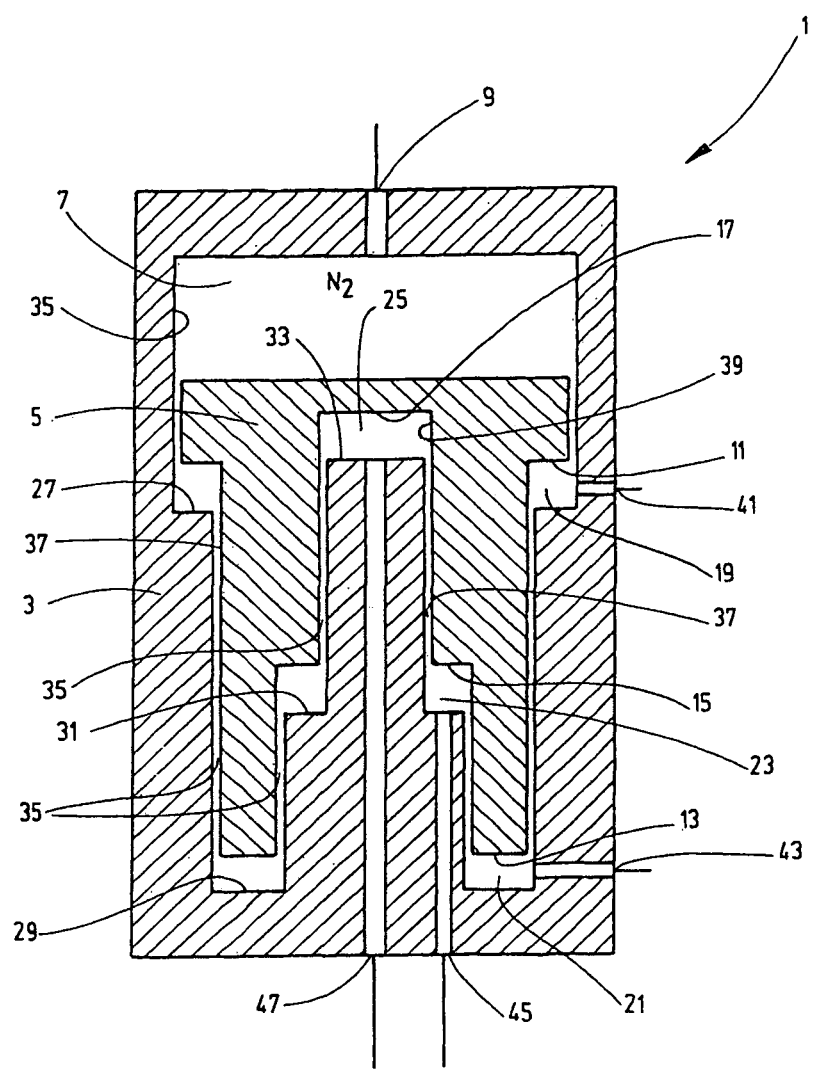
FIG. 1 is a highly schematic, simplified side view in section of a hydropneumatic piston accumulator in a multi-stage design for use in the system according to an exemplary embodiment of the invention.

The hydropneumatic piston accumulator 1, which is shown in a schematic, simplified depiction in FIG. 1, has an accumulator piston 5 that is axially movably guided in an accumulator housing 3. The accumulator piston separates a gas side 7, on which a filling port 9 is located, from fluid-side pressure chambers in the accumulator housing 3. The accumulator piston 5 is designed in the manner of a step piston such that, in combination with corresponding stepped portions of the accumulator housing 3, the accumulator piston delimits fluid-side pressure chambers 19, 21, 23 and 25, which are adjacent to active surfaces of different sizes on the fluid side of the accumulator piston 5. In FIG. 1, these active surfaces 11, 13, 15 and 17 are arranged from the largest surface to the smallest surface. The active surfaces 11, 13 and 15 are each formed by annular surfaces disposed concentrically relative to the longitudinal axis, which surfaces surround the inner-most active surface 17 in the form of a circular surface. Pressure chambers 19, 21 or 23, respectively, which are adjacent to the active surfaces 11, 13 and 15, are delimited by mating surfaces 27 or 29 or 31, respectively, of the accumulator housing 3, as well as by cylinder surfaces 35 of the cylinder housing 3 and cylinder surfaces 37 on the accumulator piston 5. The pressure chamber 25 adjacent to the active surfaces 17 is delimited by a mating surface 33 of the accumulator housing 3 as well as a cylinder surface 39 of the accumulator piston 5.

A fluid port 41, 43, 45 or 47, respectively, is provided for each pressure chamber 19, 21, 23, 25. Just as the active surfaces 11, 13, 15 and 17 are disposed on the accumulator piston 5, the associated mating surfaces 27, 29, 31 or 33 respectively are disposed on the accumulator housing 3 in steps that are axially spaced relative to one another.

Figure 2:
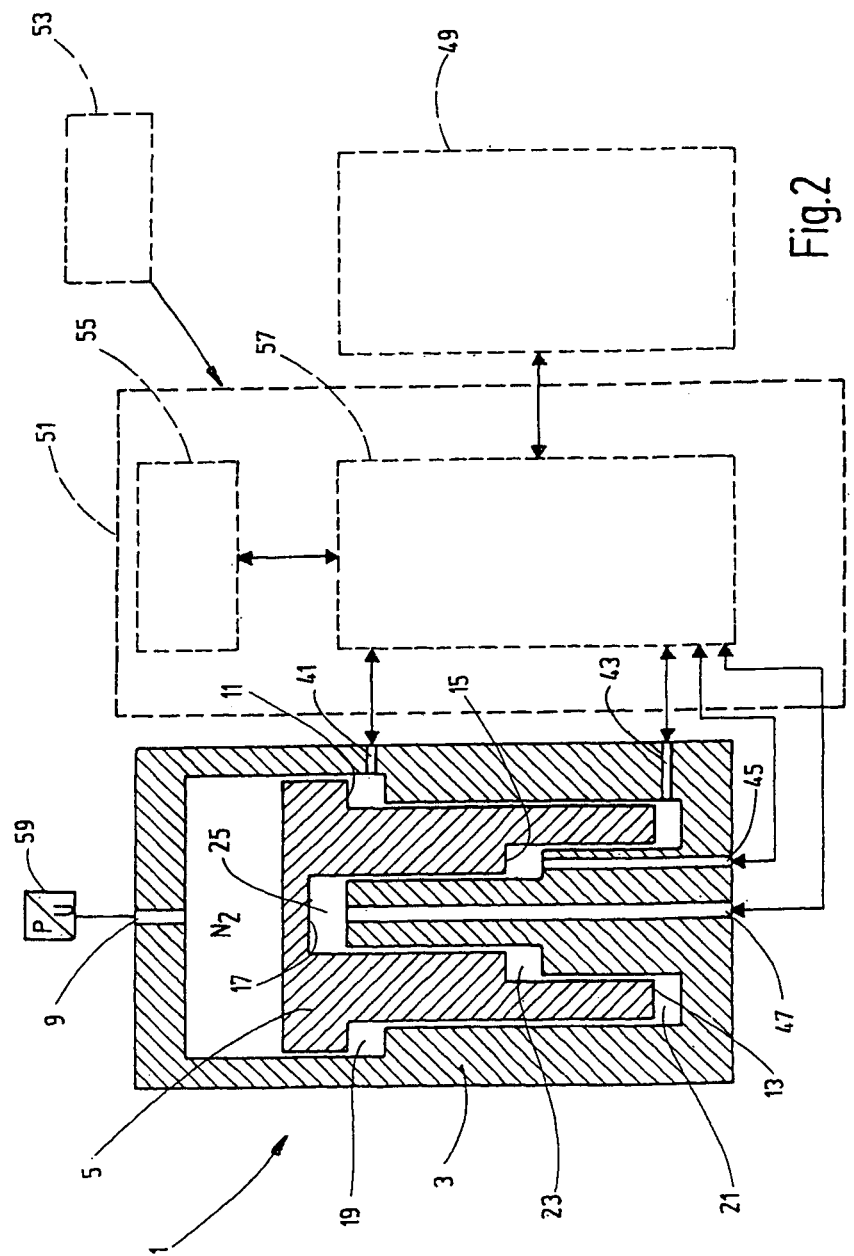
FIG. 2 is a schematic diagram of the piston accumulator of FIG. 1 in conjunction with associated system components of the system according to the exemplary embodiment of the invention.
Figure 3:
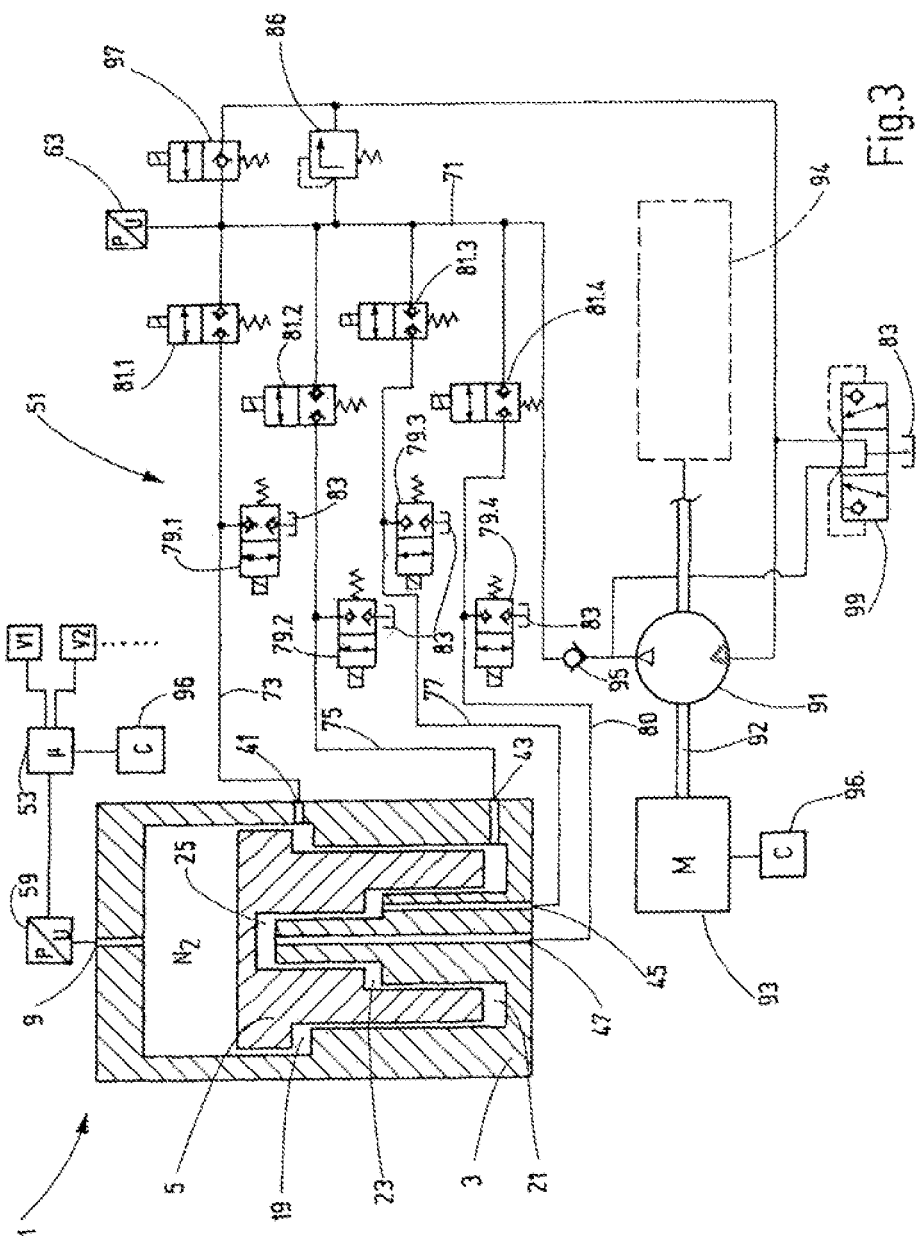
FIG. 3 is the piston accumulator of FIG. 1 in a hydraulic circuit diagram of a hybrid system according to the exemplary embodiment of the invention depicted by schematic symbols.

FIG. 2 shows the piston accumulator 1 in conjunction with associated system components. An actuator 49 is operatively connected to an adjustment assembly 51. The actuator 49 has a motor pump unit 91 (FIG. 3) coupled with a device 94 (FIG. 3). A control logic unit 53 is associated with the adjustment assembly 51, which logic unit actuates a valve arrangement 57 of the adjustment assembly 51 by a control and regulation unit 55. As will be explained in greater detail on the basis of FIG. 3, the valve arrangement 57 has selector valve, which produces selected fluid connections between the actuator 49 and the fluid ports 41, 43, 45, 47 of the piston accumulator 1, to selectively activate the pressure chambers 19, 21, 23 and 25 for charging and discharging processes. To this end, the control logic unit 53 processes signals, which are provided by sensor devices and which represent or provide signals representative of the operating states of actuator 49 and piston accumulator 1. Only one of the sensor devices, a pressure sensor 59 at the filling port 9 of the piston accumulator 1, is shown in FIG. 2.

FIG. 3 shows the hydraulic circuit diagram of an embodiment of the hydraulic hybrid system, according to an exemplary embodiment of the invention, wherein the actuator 49 has a motor pump unit 91. The pump shaft 92 of motor unit 91 is coupled to a drive source on one side, for example an internal combustion engine 93, and is coupled to a rotary driven device 94 on the other side. This device 94 may be working hydraulics, a traction drive or the like, i.e. it may be a device, which works as a consumer of hydraulic energy in one operating state, and as a producer of hydraulic energy in other operating states, for example in the case of braking processes of the traction drive. A corresponding torque is generated at the pump shaft 92. The pressure side of the motor pump unit 91 is connected, by a check valve 95, to a main line 71 of the adjustment assembly 91 that guides the system pressure. These adjustment assemblies each have a connection line 73, 75, 77, 80, respectively, which connection lines serve as a connection between the main line 71 and each of the fluid ports 41, 43, 45 and 47 of the piston accumulator 1. A valve group, which can be actuated by the control logic unit 53, is located in each of the connecting lines, which valve groups are symbolically designated as $v_1$, $v_2$, etc. Each valve group is formed by two fast switching 2/2-way-valves 79 and 81, and are identified with indices 1 to 4 for the valve groups $v_1$ to $v_4$. Each of the connecting lines 73, 75, 77, 80 can be connected or blocked from the associated fluid ports 41, 43, 45 or 47 respectively of the piston accumulator 1 by the directional valves 81.1 to 81.4. The respective connecting lines can be connected to the tank 83 by the directional valves 79.1 to 79.4.

A pressure sensor 59 that detects the gas side pressure is provided at the filling port 9 of the piston accumulator 1. A pressure sensor 63 that detects the system pressure is provided at the main line 71. A speed sensor 96 is provided at the drive motor 93. Each sensor generates the signals that are to be processed by the control logic unit 53. The control logic unit 53 decides, on the basis of these signals, which of the connecting lines 73, 75, 77 or 80, or which combination of these connecting lines, will establish the connection between the main line 71 and the respective associated fluid ports 41, 43, 45, 47 on the piston accumulator 1. The selection is thereby made as to which of the pressure chambers 19, 21, 23, 25, or which combination of these pressure chambers, is most suited for a charging process or discharging process with the respective prevailing pressure level of the system pressure (main line 71) and of the accumulator 1. In the case of discharging processes, the recovered energy is returned by a selector valve 97 to the suction side of the motor pump unit 91 from the main line 71, which main line is secured by means of a pressure relief valve 86. For charging processes, the selector valve 97 is closed, and one connecting line or a plurality of the connecting lines 73, 75, 77, 80 are activated by the directional valves 81.1 to 81.4. The respective associated directional valves 79.1 to 79.4 are closed. On the other hand, the directional valves 79.1 to 79.4 form the connection to the tank 83 for the respective non-activated connecting lines 73, 75, 77, 80, so that the connected, non-selected pressure chambers 19, 21, 23 or 25 of the accumulator 1 can be refilled without pressure in the case of discharging processes, and can be refilled from the tank 83 in the case of charging processes. In the case of changing system conditions, the respective selected combination of the active surfaces 11, 13, 15, 17 can be changed during the charging processes or discharging processes. An inverse shuttle valve 99 is provided to discharge the excess amount of fluid in the circuit coming from the accumulator 1 during the discharging processes, from the now unpressurized downstream side of the motor pump unit 91 to the tank 83. The upstream side of the motor pump unit 91 can be connected to the tank 83 by this shuttle valve for the refilling operations during charging processes. The motor pump unit 91 has a fixed displacement pump.

While one embodiment has been chosen to illustrate the invention, it will be understood by those skilled in the art that various changes and modifications can be made therein without departing from the scope of the invention as defined in the claims.

The invention claimed is:

1. A hydraulic hybrid system for rotary applications, comprising:
   a motor pump unit;
   a rotary-operating device being coupled to said motor pump unit, being a consumer of hydraulic energy in a first operating state and being a producer of hydraulic energy in a second operating state;
   an adjustable hydropneumatic piston accumulator being connected in fluid communication with said motor pump unit, being chargeable by said motor pump unit for energy storage in the second operating state and being discharged for energy release to said motor pump unit in the first operating state, said piston accumulator having a plurality of separate pressure chambers adjacent to active surfaces of different sizes on a fluid side of an accumulator piston in said piston accumulator, said piston accumulator having a gas side and having two of said active surfaces inside said accumulator piston in a stepped configuration; and
   an adjustment assembly connecting a selected one of said pressure chambers or a plurality of selected ones of said pressure chambers of said piston accumulator to said motor pump unit depending on prevailing pressure levels on said piston accumulator, and motor pump unit and said rotary-operating device.

2. A hydraulic hybrid system according to claim 1 wherein said rotary-operating device is a traction device.

3. A hydraulic hybrid system according to claim 1 wherein said piston accumulator comprises an accumulator housing having mating surfaces corresponding to and adjacent to said active surfaces of said accumulator piston, said mating surfaces of said accumulator housing and said active surfaces associated therewith delimit said separate fluid pressure chambers.

4. A hydraulic hybrid system according to claim 3 wherein said mating surfaces on said accumulator housing are disposed in steps axially spaced from one another.

5. A hydraulic hybrid system according to claim 4 wherein said active surfaces of different sizes and said mating surfaces on said accumulator housing are annular and concentric to a longitudinal axis of said piston accumulator.

6. A hybrid system according to claim 5 wherein said mating surfaces on said accumulator housing are on a housing projection extending inside said piston accumulator.

7. A hybrid system according to claim 3 wherein said mating surfaces on said accumulator housing are on a housing projection extending inside said piston accumulator.

8. A hydraulic hybrid system according to claim 1 wherein said adjustment assembly comprises selector valves selectively connecting the selected one or the selected ones of said pressure chambers for charging and discharging to said motor pump unit and connecting remaining ones of said fluid pressure chambers to a tank.

9. A hydraulic hybrid system according to claim 1 wherein a control logic unit is connected to a speed sensor connected to said motor pump unit and generating signals of a rotational speed of said motor pump unit used by said control logic unit.

10. A hydraulic hybrid system according to claim 1 wherein
   said adjustment assembly comprises directional valves controlling a connection between said pressure chambers of said accumulator and said motor pump unit.

11. An adjustable hydropneumatic piston accumulator, comprising:
   an accumulator housing having an internal chamber, said internal chamber having a plurality of active housing surfaces of different sizes and having a longitudinal axis;
   an accumulator piston axially movable in said accumulator housing along said longitudinal axis and separating said internal chamber of said accumulator housing into a fluid side and a gas side, said accumulator piston having two active piston surfaces of different sizes inside said accumulator piston in a stepped configuration; and a plurality of separate pressure chambers adjacent to said housing surfaces and said piston surfaces in said fluid side.

12. An adjustable hydropneumatic piston accumulator according to claim 11 wherein
said housing surfaces and said piston surfaces delimit said pressure chambers in directions along said longitudinal axis.

13. An adjustable hydropneumatic piston accumulator according to claim 12 wherein
said housing surfaces are disposed in steps axially spaced from one another.

14. An adjustable hydropneumatic piston accumulator according to claim 13 wherein
said piston surfaces and said housing surfaces are annular and concentric to said longitudinal axis.

15. An adjustable hydropneumatic piston accumulator according to claim 14 wherein
said housing surfaces are on a housing projection extending inside said accumulator piston.

16. An adjustable hydropneumatic piston accumulator according to claim 11 wherein
said housing surfaces are on a housing projection extending inside said accumulator piston.

* * * * *